United States Patent
Morino et al.

(10) Patent No.: US 8,515,573 B2
(45) Date of Patent: Aug. 20, 2013

(54) SORT PATTERN CREATING DEVICE, SORT PATTERN CREATING METHOD, AND SORT PATTERN CREATING SYSTEM

(75) Inventors: Hajime Morino, Kasukabe (JP); Kozen Nakai, Funabashi (JP); Masanori Nose, Tokyo-To (JP)

(73) Assignee: Glory Ltd., Himeji-Shi, Hyogo-Ken (JP)

( * ) Notice: Subject to any disclaimer, the term of this patent is extended or adjusted under 35 U.S.C. 154(b) by 864 days.

(21) Appl. No.: 12/449,421

(22) PCT Filed: Feb. 8, 2007

(86) PCT No.: PCT/JP2007/052189
§ 371 (c)(1),
(2), (4) Date: Aug. 7, 2009

(87) PCT Pub. No.: WO2008/096429
PCT Pub. Date: Aug. 14, 2008

(65) Prior Publication Data
US 2010/0017018 A1    Jan. 21, 2010

(51) Int. Cl.
*G06F 7/00* (2006.01)
(52) U.S. Cl.
USPC ......... 700/223; 194/206; 194/215; 271/10.01
(58) Field of Classification Search
USPC .......................................................... 700/223
See application file for complete search history.

(56) References Cited

U.S. PATENT DOCUMENTS

| | | | |
|---|---|---|---|
| 4,694,963 A * | 9/1987 | Takesako | 209/534 |
| 6,278,795 B1 | 8/2001 | Anderson et al. | 382/135 |
| 7,232,024 B2 * | 6/2007 | Mazur et al. | 194/207 |
| 7,735,621 B2 * | 6/2010 | Hallowell et al. | 194/206 |
| 7,817,842 B2 * | 10/2010 | Mennie | 382/137 |
| 8,074,806 B2 * | 12/2011 | Ozaki et al. | 209/534 |
| 2002/0056958 A1 * | 5/2002 | Urata et al. | 271/10.01 |
| 2003/0015395 A1 * | 1/2003 | Hallowell et al. | 194/206 |
| 2003/0121753 A1 | 7/2003 | Stromme et al. | 194/207 |

(Continued)

FOREIGN PATENT DOCUMENTS

| | | |
|---|---|---|
| EP | 1 734 489 A2 | 12/2006 |
| JP | 63-177288 | 7/1988 |
| JP | 2003-281591 | 10/2003 |
| JP | 2006-107212 | 4/2006 |

OTHER PUBLICATIONS

European Search Report (dated Nov. 2, 2010—7 pages).

*Primary Examiner* — Gene Crawford
*Assistant Examiner* — Kyle Logan
(74) *Attorney, Agent, or Firm* — Renner, Kenner, Greive, Bobak, Taylor & Weber

(57) ABSTRACT

A sort pattern creating method, for a banknote handling apparatus, comprises a step of selecting a denomination of banknote (S501), a step of selecting a print version of banknote (S502), a step of selecting a direction of banknote (S503), a step of selecting a fitness of banknote (S504), a step of creating the sort pattern by combining the contents selected in the step of selecting a denomination of banknote, a print version of banknote, a direction of banknote and a fitness of banknote (S505). The sort pattern creating method comprises a step of checking a validity of the combination of the contents, wherein the combination is valid when a type of banknote is defined to be sorted into one stacking unit, and the combination is not valid when the type of banknote is not defined to be sorted into one stacking unit.

33 Claims, 12 Drawing Sheets

(56) References Cited

U.S. PATENT DOCUMENTS

| | | | |
|---|---|---|---|
| 2004/0003980 A1 | 1/2004 | Hallowell et al. | 194/206 |
| 2004/0118754 A1* | 6/2004 | Hunter et al. | 209/577 |
| 2004/0186937 A1* | 9/2004 | Jonsson | 710/72 |
| 2005/0040225 A1* | 2/2005 | Csulits et al. | 235/379 |
| 2005/0150738 A1* | 7/2005 | Hallowell et al. | 194/206 |
| 2007/0119681 A1* | 5/2007 | Blake et al. | 194/215 |
| 2008/0173714 A1* | 7/2008 | Kite et al. | 235/386 |

* cited by examiner

SORT PATTERN CREATING DEVICE, SORT PATTERN CREATING METHOD, AND SORT PATTERN CREATING SYSTEM

FIELD OF THE INVENTION

The present invention relates to a sort pattern creating device, a sort pattern creating method, and a sort pattern creating system, and more particularly, to a sort pattern creating device, a sort pattern creating method, and a sort pattern creating system, for creating a sort pattern used in a banknote handling apparatus.

BACKGROUND OF THE INVENTION

In recent years, banknote handling apparatuses that sort and stack banknotes are used in various industries. The methods for sorting banknotes vary over a wide range among industries, and there is an increasing demand for banknote handling apparatus that can cope with various sort patterns.

To satisfy such a demand, there has been a banknote handling apparatus disclosed in Patent Document 1 described below. The banknote handling apparatus disclosed in Patent Document 1 stores the plurality of sort patterns, and arbitrarily selects one of the sort patterns. Therefore, to set a sort pattern not stored in the banknote handling apparatus, the operation unit or the display unit of the banknote handling apparatus is used to edit and set the sort pattern. Also, as the number of stacking units has increased, the task to set sort patterns has become more and more complicated. Furthermore, to set the same sort pattern with respect to the plurality of banknote handling apparatuses, the same setting operation is performed on each banknote handling apparatus.

However, there is a limit to the sizes of the operation unit and the display unit of each banknote handling apparatus. Therefore, the operation to set a complicated sort pattern is difficult, and often causes an operator to make a mistake. Also, in a case where the same sort pattern is set with respect to the plurality of banknote handling apparatuses, there is a problem that an operator tends to make a mistake.

[Patent Document 1]
Japanese Patent Application Laid-Open No. 59-21184 (JP59-21184A)

DISCLOSURE OF THE INVENTION

Technical Problem to be Solved

It is an object of the present invention to simplify a task required for setting a sort pattern and to prevent a wrong operation by an operator.

Solution to Problem

According to the first aspect of the present invention, a sort pattern creating method for creating a sort pattern, for a banknote handling apparatus in which banknotes are stacked in accordance with the sort pattern, the sort pattern creating method comprising: a step of selecting a denomination of banknote to be stacked from among a plurality of options for the denomination; a step of selecting a print version of banknote to be stacked from among a plurality of options for the print version, independent from the content selected in the step of selecting a denomination of banknote; a step of selecting a direction of banknote to be stacked from among a plurality of options for the direction, independent from the contents selected in the step of selecting a denomination of banknote and the step of selecting a print version of banknote; a step of selecting a fitness of banknote to be stacked from among a plurality of options for the fitness, independent from the contents selected in the step of selecting a denomination of banknote, the step of selecting a print version of banknote and the step of selecting a direction of banknote; and a step of creating the sort pattern by combining the contents selected in the step of selecting a denomination of banknote, the step of selecting a print version of banknote, the step of selecting a direction of banknote and the step of selecting a fitness of banknote, is provided.

According to the second aspect of the present invention, a sort pattern creating device for creating a sort pattern, for a banknote handling apparatus in which banknotes are stacked in accordance with the sort pattern, the sort pattern creating device comprising: a denomination selecting unit for selecting a denomination of banknote to be stacked from among a plurality of options for the denomination; a print version selecting unit for selecting a print version of banknote to be stacked from among a plurality of options for the print version, independent from the content selected by the denomination selecting unit; a direction selecting unit for selecting a direction of banknote to be stacked from among a plurality of options for the direction, independent from the contents selected by denomination selecting unit and the print version selecting unit; a fitness selecting unit for selecting a fitness of banknote to be stacked from among a plurality of options for the fitness, independent from the contents selected by the denomination selecting unit, the print version selecting unit and the direction selecting unit; and a creating unit for creating the sort pattern by combining the contents selected by the denomination selecting unit, the print version selecting unit, the direction selecting unit and the fitness selecting unit, is provided.

According to the third aspect of the present invention, a sort pattern creating system comprising a banknote handling apparatus in which banknotes are stacked in accordance with a sort pattern, a sort pattern creating device for creating the sort pattern, for the banknote handling apparatus, and a first network which communicatably connects the banknote handling apparatus and the sort pattern creating device; wherein the sort pattern creating device comprising; a denomination selecting unit for selecting a denomination of banknote to be stacked from among a plurality of options for the denomination; a print version selecting unit for selecting a print version of banknote to be stacked from among a plurality of options for the print version, independent from the content selected by the denomination selecting unit; a direction selecting unit for selecting a direction of banknote to be stacked from among a plurality of options for the direction, independent from the contents selected by denomination selecting unit and the print version selecting unit; a fitness selecting unit for selecting a fitness of banknote to be stacked from among a plurality of options for the fitness, independent from the contents selected by the denomination selecting unit, the print version selecting unit and the direction selecting unit; a creating unit for creating the sort pattern by combining the contents selected by the denomination selecting unit, the print version selecting unit, the direction selecting unit and the fitness selecting unit; and a first transmitting unit for transmitting the sort pattern created by the creating unit to the banknote handling apparatus, wherein the banknote handling apparatus comprising a memory which stores the sort pattern transmitted by the first transmitting unit, is provided.

Advantageous Effects of Invention

According to the present invention, the task required for setting the sort pattern can be simplified and a wrong operation by an operator can be prevented.

Figure 1:
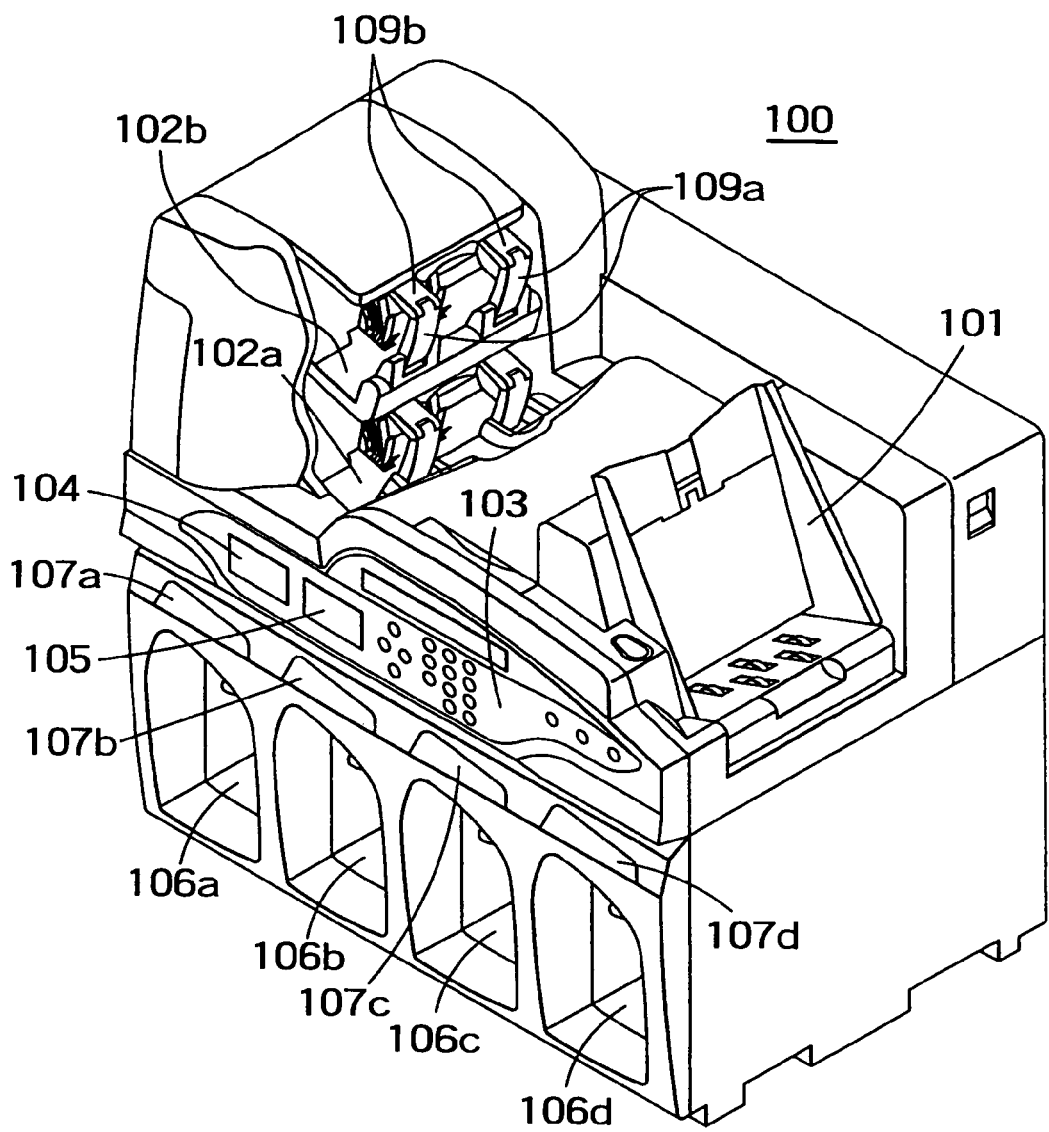
FIG. 1 is an external perspective view of a banknote handling apparatus 100 in accordance with an embodiment of the present invention.

100 banknote handling apparatus
101 take-in unit
102a, 102b first and second upper stacking unit
103 operation unit (designation unit)
104 first overall display unit
105 second overall display unit
106a through 106d first through fourth lower stacking unit
107a through 107d first through fourth individual display unit
108 storage medium access unit
109a, 109b first and second arm
111 control unit
112 storage unit
113 recognition unit
114 transport path (transport unit)
121 through 127 sensor
201 control unit
202 storage unit
203 selecting unit
204 creating unit
205 editing unit
206 checking unit
207 notifying unit
208 input supporting unit
209 instructing unit
211 communication control unit
212 storage medium access unit
213 display unit
214 input unit

DETAILED DESCRIPTION OF THE INVENTION

The following is a description of embodiments of the present invention, with reference to the accompanying drawings. It should be noted that the following embodiments are merely examples, and do not limit the scope of the present invention.

FIG. 1 is an external perspective view of a banknote handling apparatus 100 in accordance with an embodiment of the present invention. As shown in FIG. 1, the banknote handling apparatus 100 comprises a take-in unit 101, first and second upper stacking units 102a and 102b, an operation unit 103, a first overall display unit 104, a second overall display unit 105, first through fourth lower stacking units 106a through 106d, and first through fourth individual display units 107a through 107d.

The take-in unit 101 is configured such that an operator sets banknotes on the take-in unit 101 in a stacked condition, and the take-in unit 101 takes in the set banknotes. Banknotes that are not stacked on the first through fourth lower stacking units 106a through 106d are discharged onto the first and second upper stacking units 102a and 102b. For example, banknote that is taken in by the take-in unit 101 but is rejected banknote (banknote that cannot be recognized due to a transportation error, or counterfeit banknote, for example) is discharged onto the first upper stacking unit 102a. Banknote that is not banknote of designated denomination to be stacked onto the first through fourth lower stacking units 106a through 106d is discharged onto the second upper stacking unit 102b. The first and second upper stacking units 102a and 102b each have stoppers that are pairs of arms. Each pair of arms is formed with a first arm 109a that has its lower end portion swingably supported by a shaft and extends upward, and a second arm 109b that is swingably supported by the top end of the first arm 109a and extends in a horizontal direction. The pairs of arms keep discharged banknotes from slipping out of the apparatus, and can move in such two directions (upward and rightward (toward the take-in unit 101)) that the discharged banknotes can be easily taken out from the apparatus.

The operation unit 103 has input keys for receiving instructions from an operator and operates as a setting unit (described later). The first overall display unit 104 and the second overall display unit 105 display a certain kind of data (graphic data, for example).

The first through fourth lower stacking units 106a through 106d sort the banknotes taken in by the take-in unit 101, in accordance with the attributes (such as the denominations, the directions and face/back (or the orientations), the fitness, and the new/old) of the banknotes. The first through fourth lower stacking units 106a through 106d then stack the sorted banknotes. The first through fourth individual display units 107a through 107d are provided for the first through fourth lower stacking units 106a through 106d, respectively, and display the number of banknotes stacked on the corresponding first through fourth lower stacking units 106a through 106d, respectively.

Figure 10:
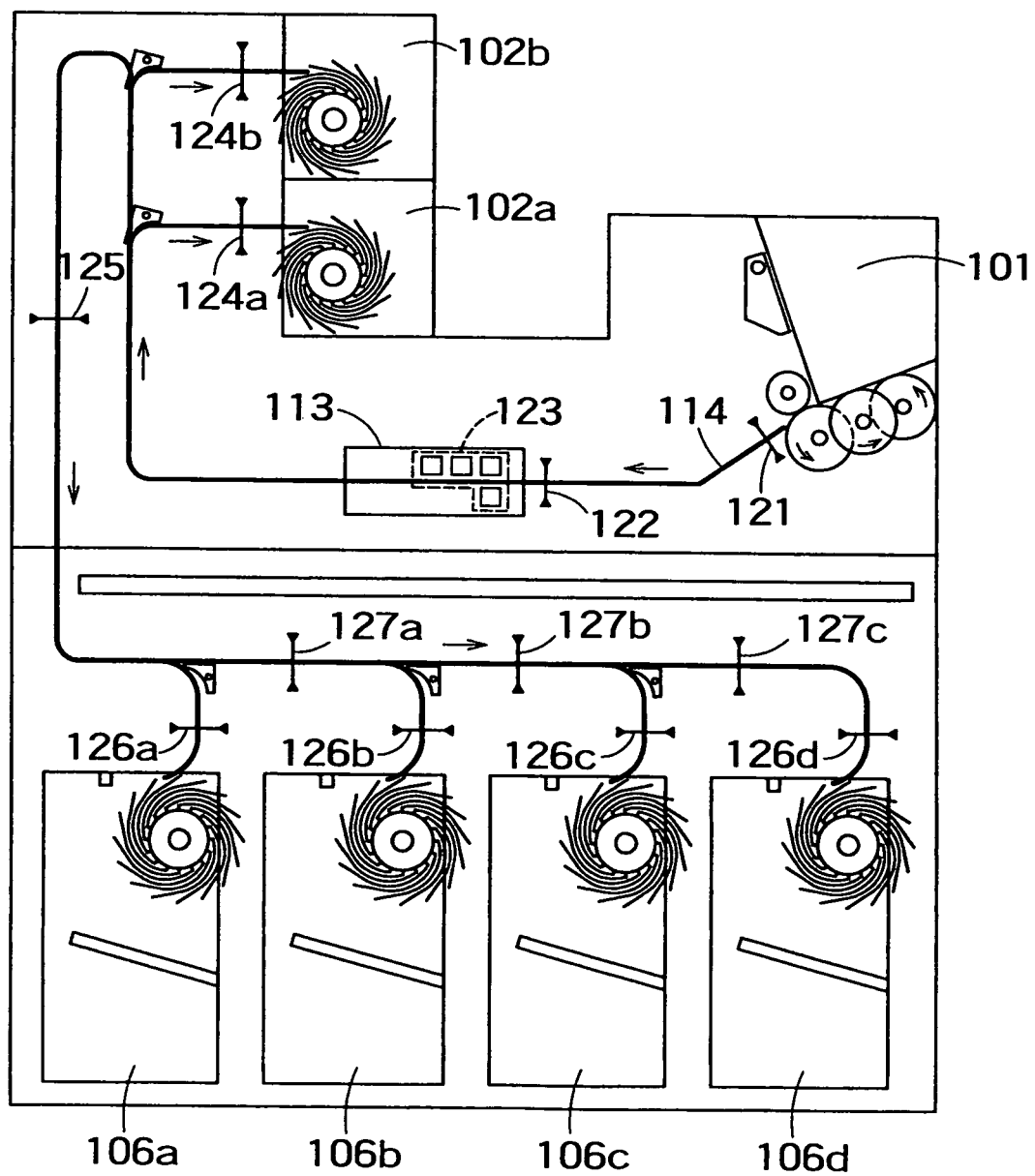
FIG. 10 is a schematic view of the inner structure of the banknote handling apparatus 100 in accordance with the embodiment of the present invention.

FIG. 10 is a schematic view of the inner structure of the banknote handling apparatus 100 in accordance with the embodiment of the present invention. As shown in FIG. 10, a transport path (a transport unit) 114 that transports the banknotes taken in by the take-in unit 101 and stacks them onto the first through fourth lower stacking units 106a through 106d is provided in the apparatus. Normally, the transport unit 114 is formed with a combination of belt conveyors. Various sensors 121 through 127 are provided along the transport unit 114. The sensor 121 provided at the outlet side of the take-in unit 101 and the sensor 122 provided at the inlet side of the recognition unit 113 described later is each designed to detect that a banknote is successfully taken in the apparatus. The recognition unit 113 provided on the transport unit 114 is formed with various sensor units, and senses the fitness, the authenticity, the denomination, the direction, the face/back, and the likes of each banknote taken in by the take-in unit 101. For example, the recognition unit 113 includes the sensor 123 that is formed with a transparent sensor.

Figure 2:
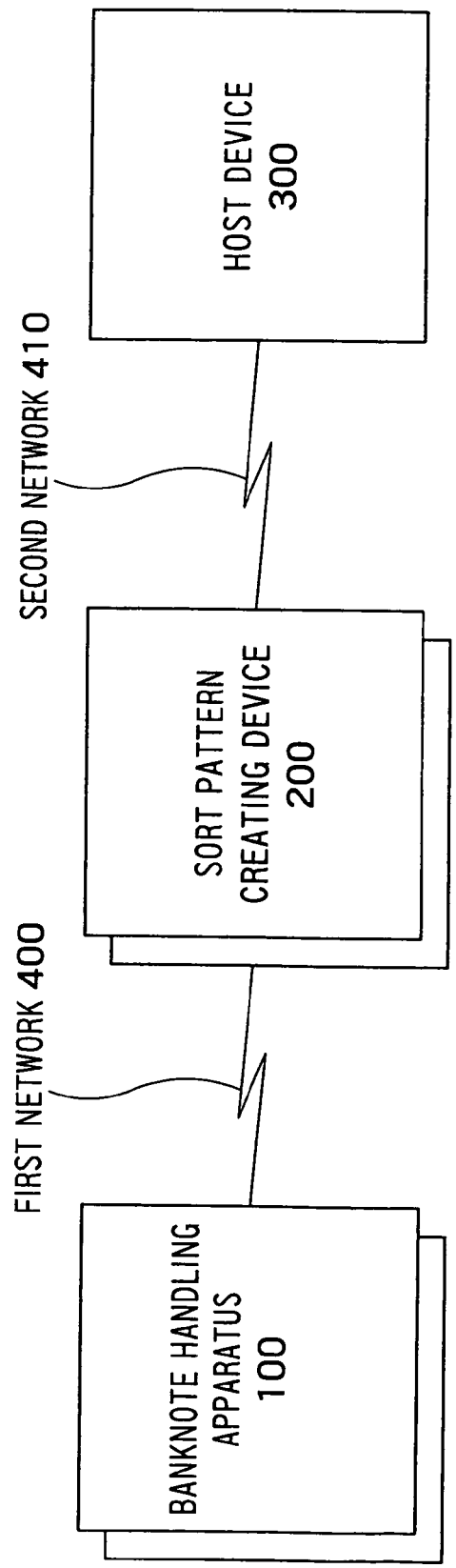
FIG. 2 is a schematic view of a sort pattern creating system in accordance with the embodiment of the present invention.

FIG. 2 is a schematic view of a sort pattern creating system in accordance with the embodiment of the present invention. In the sort pattern creating system in accordance with the embodiment of the present invention, one or more banknote handling apparatuses 100 are connected to a sort pattern creating device 200 via a first network 400, and one or more sort pattern creating devices 200 are connected to a host device 300 via a second network 410. For example, more than one banknote handling apparatuses 100 and one or more pattern creating devices 200 are provided in a store, and the host device 300 connected to a plurality of stores located in remote places with respect to one another is provided at a remote center or the like.

Figure 3:
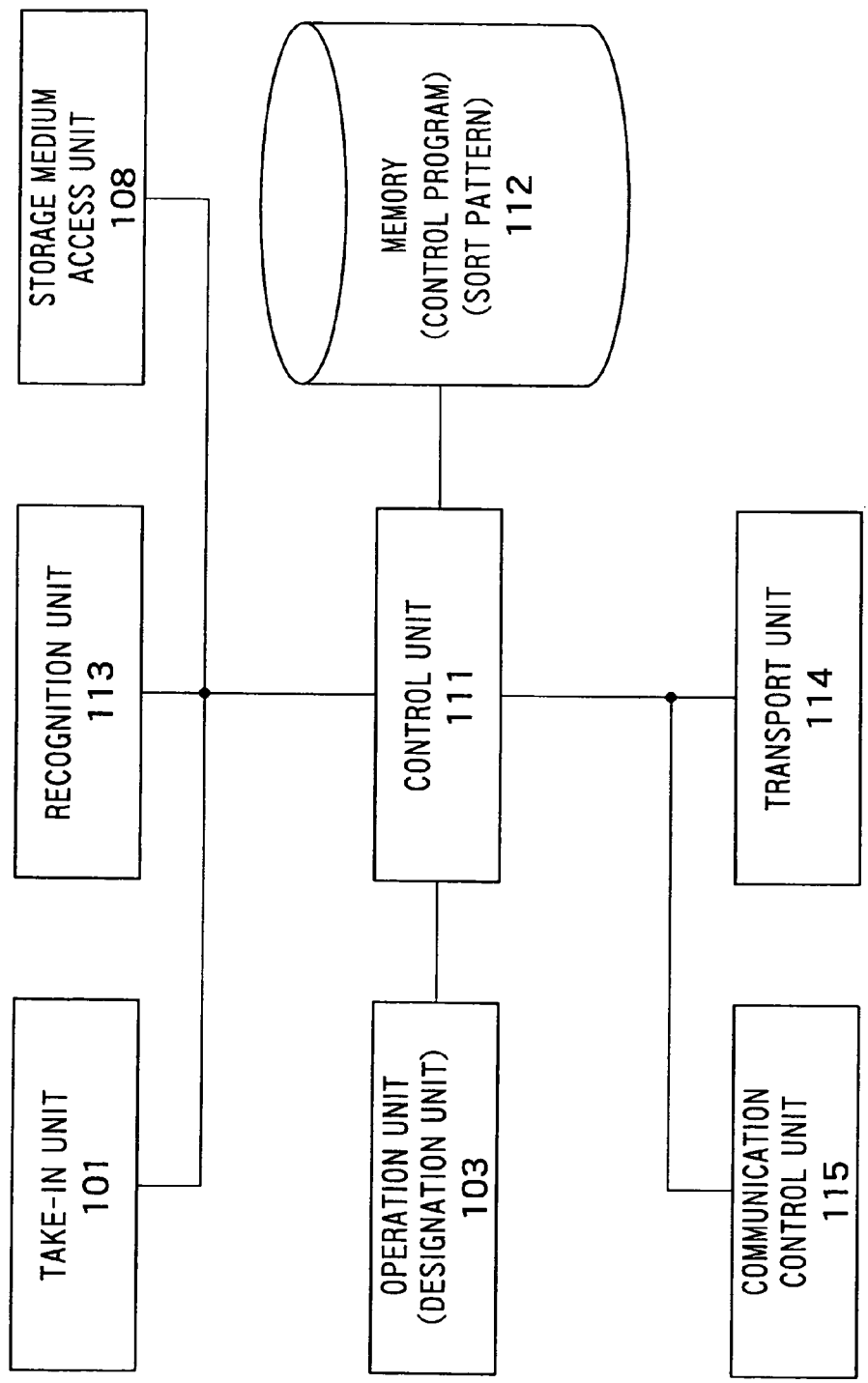
FIG. 3 is a block diagram showing the structure of the banknote handling apparatus 100 in accordance with the embodiment of the present invention.

FIG. 3 is a block diagram showing the structure of the banknote handling apparatus 100 in accordance with the embodiment of the present invention. The banknote handling apparatus 100 in accordance with the embodiment of the present invention comprises a control unit 111 and a memory 112. The control unit 111 controls the take-in unit 101, the operation unit 103, a storage medium access unit 108, the recognition unit 113, the transport unit 114, and a communication control unit 115.

The storage medium access unit 108 is formed with a memory slot to which a storage medium such as a CF card is to be inserted, so that data reading/writing can be performed with respect to the storage medium. The storage medium access unit 108 is provided in the banknote handling apparatus 100.

A control program designed for the control unit 111 to control the respective units and a sort pattern described later are stored in the memory 112. The communication control unit 115 exchanges data with the sort pattern creating device 200.

Figure 4:
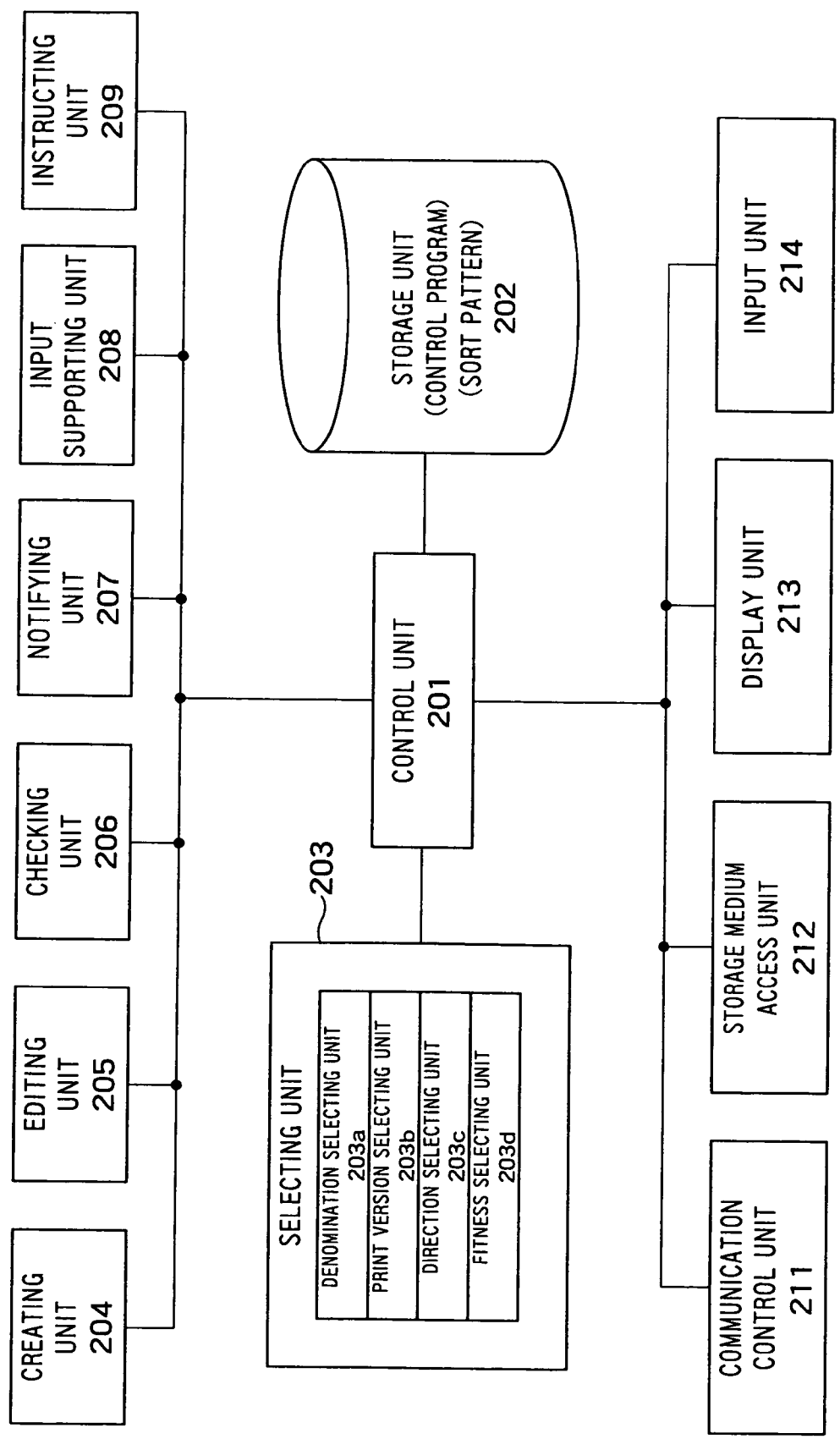
FIG. 4 is a block diagram showing the structure of a sort pattern creating device 200 in accordance with the embodiment of the present invention.

FIG. 4 is a block diagram showing the structure of the sort pattern creating device 200 in accordance with the embodiment of the present invention. The sort pattern creating device 200 in accordance with the embodiment of the present invention comprises a control unit 201 and a storage unit 202. The control unit 201 controls a communication control unit 211, a storage medium access unit 212, a display unit 213, and an input unit 214.

The control unit 201 displays a selecting unit 203, a creating unit 204, an editing unit 205, a checking unit 206, a notifying unit 207, an input supporting unit 208, and an instructing unit 209 on the display unit 213, so as to receive instructions from an operator. A control program designed for the control unit 201 to control the respective units and a sort pattern described later are stored in the storage unit 202.

The selecting unit 203 includes a denomination selecting unit 203a, a print version selecting unit 203b, a direction selecting unit 203c, and a fitness selecting unit 203d. Based on the instruction from an operator, the selecting unit 203 selects a sort condition. In accordance with the selected sort condition, the creating unit 204 creates a sort pattern, and stores the sort pattern into the storage unit 202. The editing unit 205 reads out the sort pattern stored in the storage unit 202, edits the sort pattern, and stores the rewritten sort pattern. The checking unit 206 checks the validity of the sort pattern (or the combination of sort conditions). The notifying unit 207 notifies an operator of various kinds of information about the sort pattern creating operation. The input supporting unit 208 provides support for re-inputting of the sort condition, if the sort pattern is not valid. The instructing unit 209 issues instructions to one or more banknote handling apparatuses 100.

The communication control unit 211 exchanges data with the banknote handling apparatus 100 and the host device 300. The storage medium access unit 212 is a memory slot to which a storage medium such as a CF card is to be inserted, so that data reading/writing can be performed with respect to the storage medium. The display unit 213 displays figures serving as the selecting unit 203, the creating unit 204, the editing unit 205, the checking unit 206, and the input supporting unit 208. The input unit 214 is designed for an operator to input instructions. The communication control unit 211 may be a network interface, the display unit 213 may be a liquid crystal display, and the input unit 214 may be a keyboard or a mouse, for example.

Figure 11:
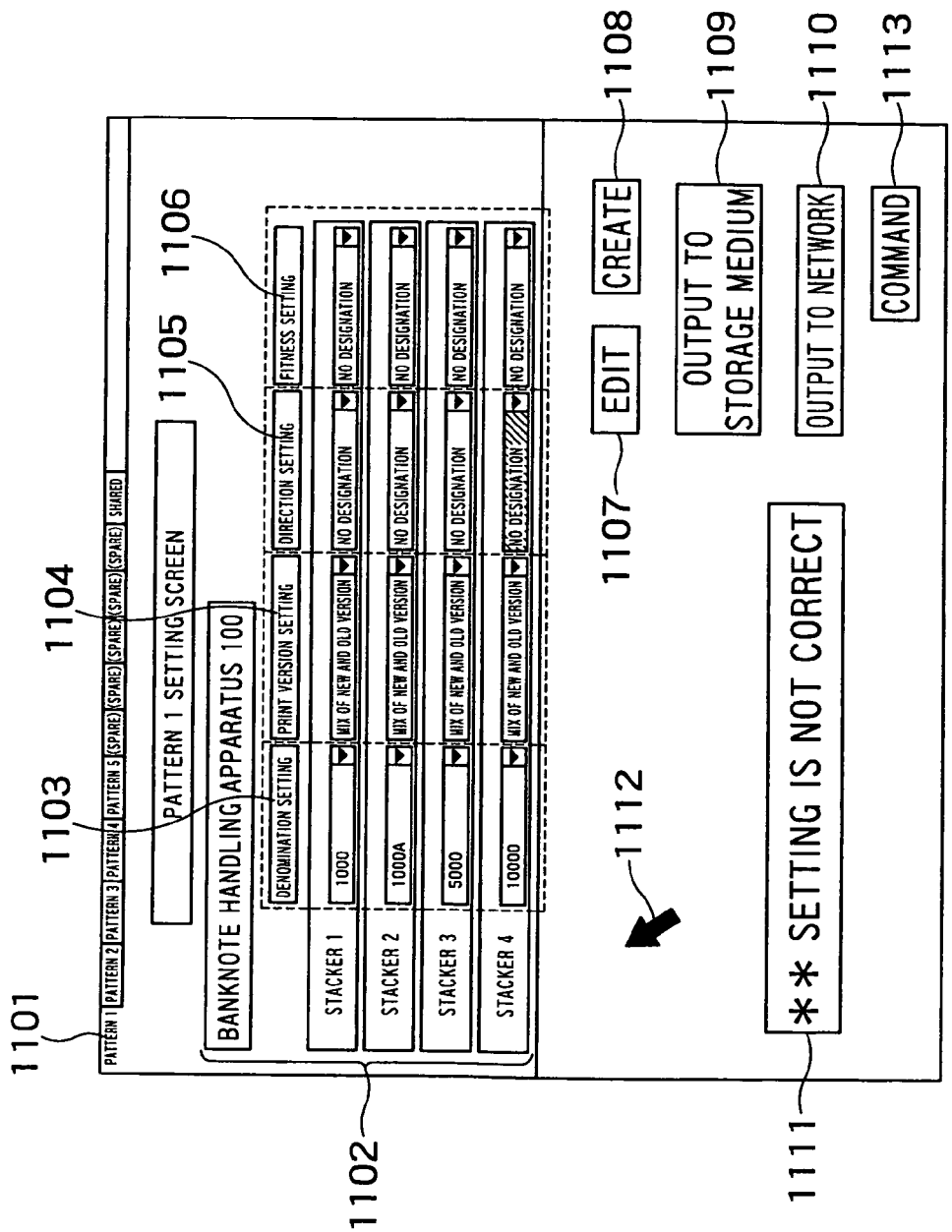
FIG. 11 shows an example of a screen to be displayed on a display unit 211.

FIG. 11 shows an example of a screen to be displayed on the display unit 211. A pattern tab 1101 is a button for selecting a sort pattern formed with a combination of sort conditions. A stacker display 1102 indicates the stackers (the first through fourth lower stacking units 106a through 106d of FIG. 1, for example) of the banknote handling apparatus 100.

A denomination setting column 1103 is the figure serving as the denomination selecting unit 203a, and a denomination condition is selected in accordance with the content that is input in a pull-down manner by an operator. A print version setting column 1104 is the figure serving as the print version setting unit 203b, and a print version condition is selected in accordance with the content that is input in a pull-down manner by an operator. Here, a "print version" is an attribute which indicates the type of the banknote concerning new/old. A direction setting column 1105 is the figure serving as the direction selecting unit 203c, and a direction condition is selected in accordance with the content that is input in a pull-down manner by an operator. A fitness setting column 1106 is the figure serving as the fitness selecting unit 203d, and a fitness condition is selected in accordance with the content that is input in a pull-down manner by an operator.

An edit button 1107 is the figure serving as the editing unit 205, and is used to read out the sort pattern stored in the storage unit 202. A create button 1108 is the figure serving as the creating unit 203, and is used to create the sort pattern by combining sort conditions.

When a storage medium output button 1109 is pressed, the storage medium access unit 212 writes the sort pattern into the storage medium. When a network output button 1110 is pressed, the communication control unit 210 transmits the sort pattern to the banknote handling apparatus 100. A command button 1113 is the figure serving as the instructing unit 209, and can be pressed only when the network output button 1110 is pressed. When the command button 1113 is pressed, the communication control unit 210 transmits an instruction of starting a sorting operation according to already transmitted sort pattern, to the banknote handling apparatus 100.

A message window 1111 is the figure serving as the notifying unit 207, and displays various messages. A cursor 1112 is an input cursor to be used to input the sort condition or to press a button.

If the validity of a sort pattern is not determined by the checking unit 206, the notifying unit 207 displays a message of that problem (such as a message "**Setting is not correct.") on the message window 1111.

The input supporting unit 208 moves the cursor 1112 to a position for re-inputting an invalid sort condition (an item with which the same condition is input for different stackers). In this case, the setting columns 1103 through 1106 of the invalid sort condition may be designed to blink.

First Embodiment

Figure 5:
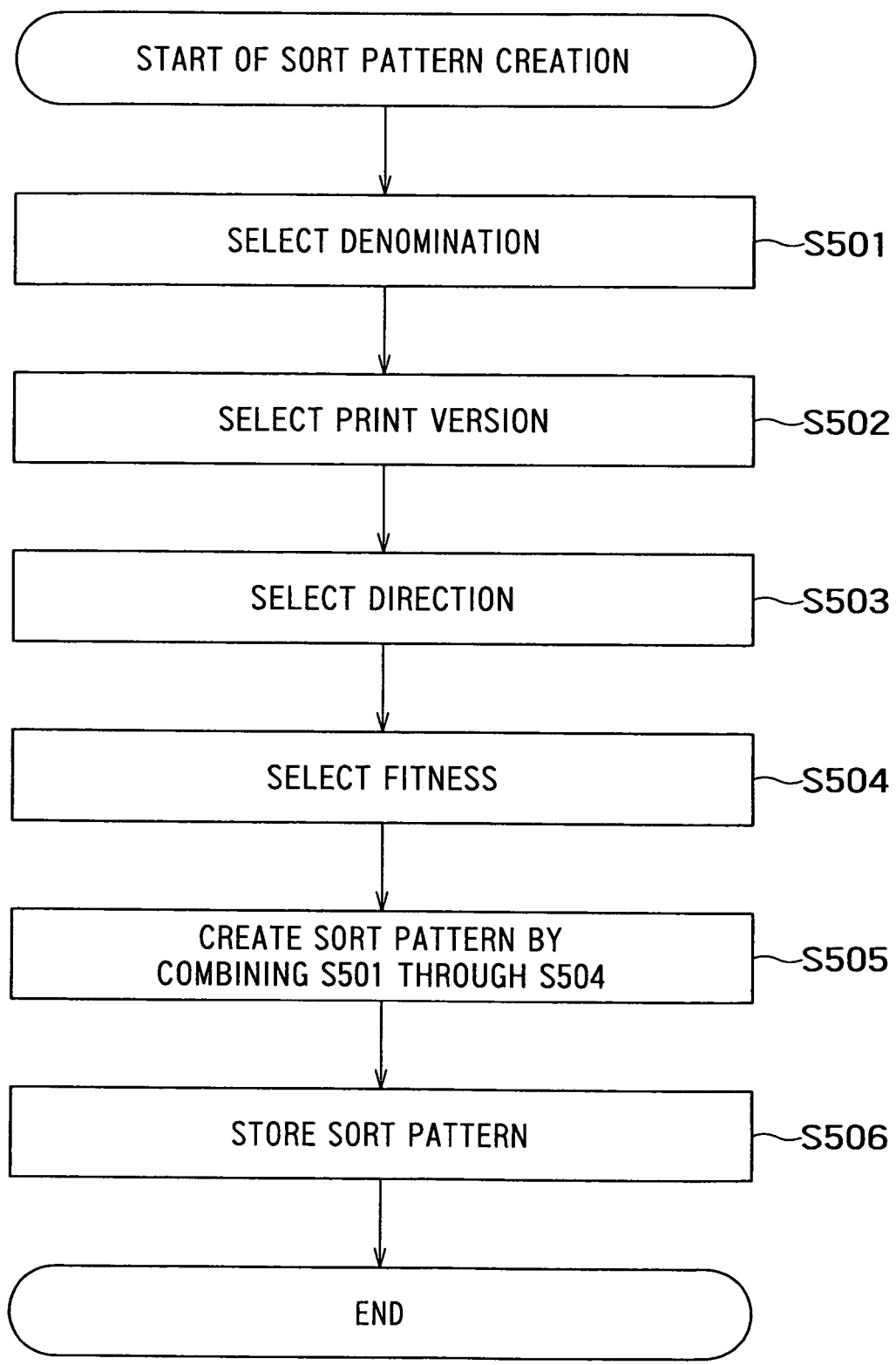
FIG. 5 is a flowchart showing the operation procedures to be carried out by a control unit 201 in a sort pattern creating operation in accordance with the first embodiment of the present invention.

Next, a first embodiment of the present invention is described. FIG. 5 is a flowchart showing the operation procedures to be carried out by the control unit 201 in a sort pattern creating operation in accordance with the first embodiment of the present invention.

First, the control unit 201 controls the denomination selecting unit 203a to select the denomination condition in accordance with the content input to the denomination setting column 1103 of FIG. 11 (S501). The control unit 201 next controls the print version selecting unit 203b to select the print version condition in accordance with the content input to the print version setting column 1104 of FIG. 11 (S502). The control unit 201 then controls the direction selecting unit 203c to select the direction condition in accordance with the content input to the direction setting column 1105 of FIG. 11 (S503). The control unit 201 next controls the fitness selecting unit 203d to select the fitness condition in accordance with the content input to the fitness setting column 1106 of FIG. 11 (S504). The order of the procedures of S501 through S504 may be changed in accordance with order that is input by an operator, and conditions are selected through the procedures of S501 through S504 independently of one another.

After the create button 1108 is pressed, the control unit 201 then controls the creating unit 204 to create a sort pattern by combining the sort conditions selected through the procedures of S501 through S504 (S505). The created sort pattern is stored into the storage unit 202 (S506), and the sort pattern creating operation is ended.

Figure 6:
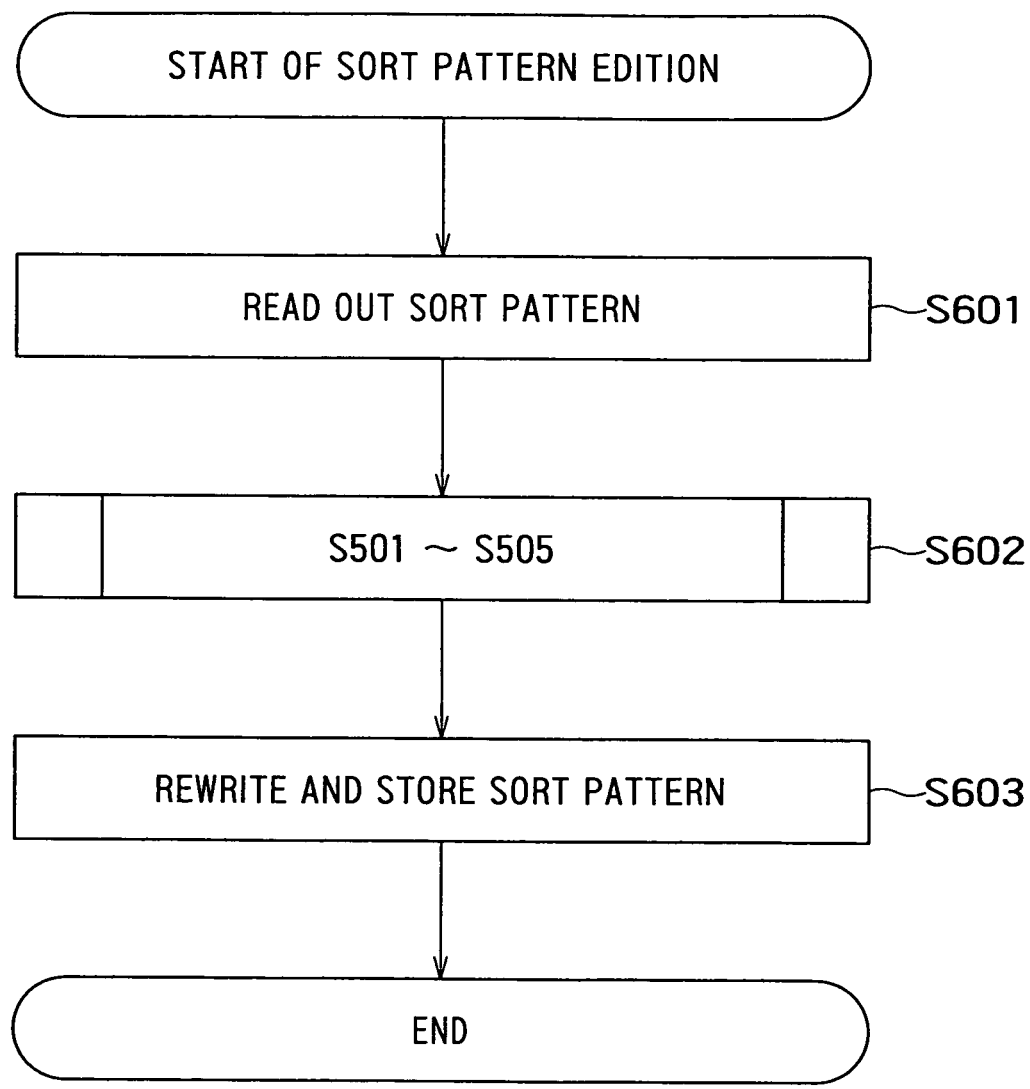
FIG. 6 is a flowchart showing the operation procedures to be carried out by the control unit 201 in a sort pattern editing operation in accordance with the first embodiment of the present invention.

FIG. 6 is a flowchart showing the operation procedures to be carried out by the control unit 201 in a sort pattern editing operation in accordance with the first embodiment of the present invention. The sort pattern editing operation is to be performed while the control unit 201 controls the editing unit 205.

First, after the edit button 1107 of FIG. 11 is pressed, the sort pattern stored in the storage unit 202 is read out (S601). The same procedures as those of S501 through S505 of FIG. 5 are then carried out (S602). The sort pattern is rewritten and stored into the storage unit 202 (S603), and the sort pattern editing operation is ended.

Figure 7:
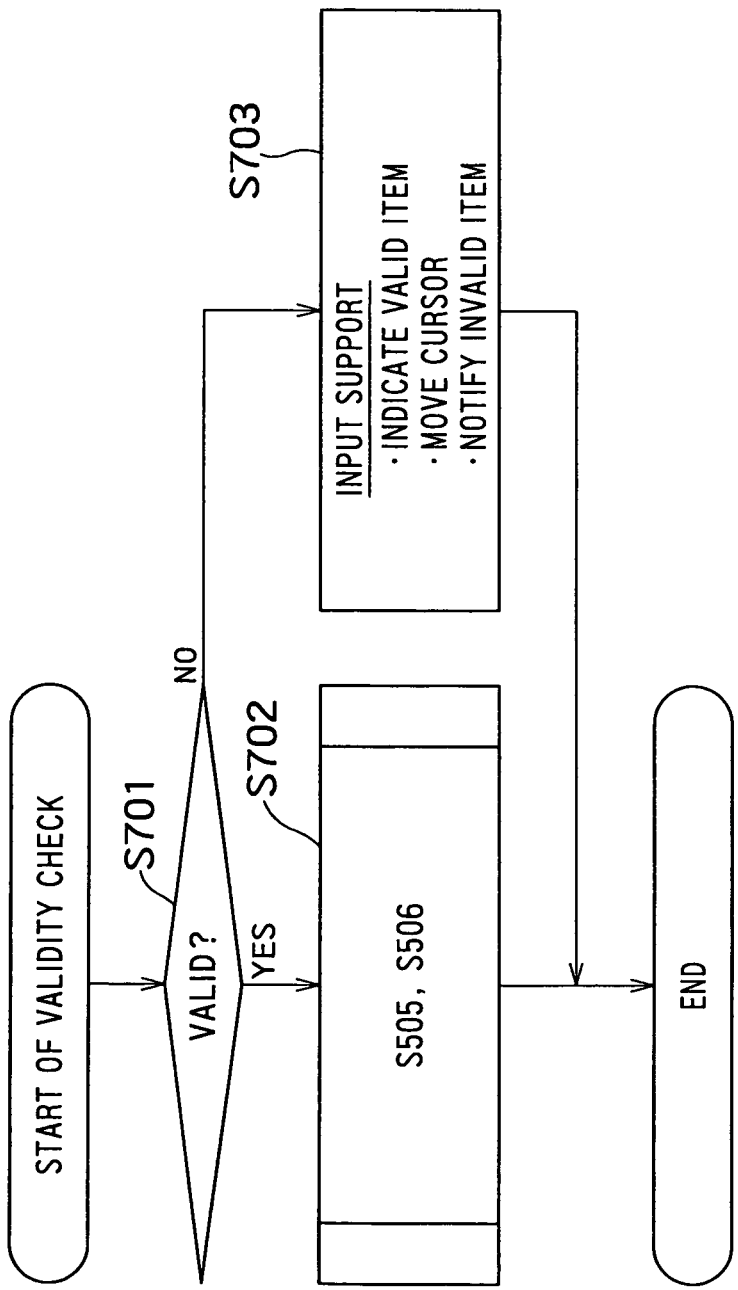
FIG. 7 is a flowchart showing the operation procedures to be carried out by the control unit 201 in a validity checking operation in accordance with the first embodiment of the present invention. The validity checking operation is to be performed while the control unit 201 controls the checking unit 206.

FIG. 7 is a flowchart showing the operation procedures to be carried out by the control unit 201 in a validity checking operation in accordance with the first embodiment of the present invention. The validity checking operation is to be performed while the control unit 201 controls the checking unit 206.

First, after the create button 1108 is pressed (S505 of FIG. 5), a check is made to determine whether the sort pattern selected through the procedures of S501 through S504 is valid or not (S701). If banknote of one type is not defined to be sorted into one stacking unit, the sort pattern is not valid. For example, in a case where "1000" is selected as the denomination condition for each of the stackers 1 and 2, and no other conditions are set, 1000-yen notes are sorted into both stackers 1 and 2, and therefore, the sort pattern is determined to be invalid.

If the sort pattern is determined to be valid (S701-Yes), the same procedures as those of S505 and S506 of FIG. 5 are carried out (S702). On the other hand, if the sort pattern is determined to be invalid (S701-No), an input support is performed (S703). More specifically, a valid item, instead of an invalid item, may be displayed in each of the setting columns 1103 through 1106. Also, the cursor 1112 may be moved to the setting column of an invalid item. Further, an invalid item may be notified in the message window 1111. After the procedure of S702 or S703 is completed, the validity checking operation is ended.

In the first embodiment, the sort pattern creating device 200 having the relatively large display unit 213 creates sort patterns. Thus, the task that an operator needs to perform to set the sort pattern can be made easier, and a false operation can be prevented.

Further, since the validity of each sort pattern is checked, an operator can be clearly notified of each invalid sort pattern, even in a case where complicated sort patterns are created. Also, complex algorithms for forming valid sort patterns are not required to be introduced into the control program for the sort pattern creating operation. Accordingly, the control program can be simplified.

Second Embodiment

Next, a second embodiment of the present invention is described. In the first embodiment, the example case where the sort pattern is created is described. In the second embodiment, an example case where created sort pattern is stored into the memory of the banknote handling apparatus 100 is described. It should be noted that explanation of the same aspects as those of the first embodiment is not described herein.

Figure 8:
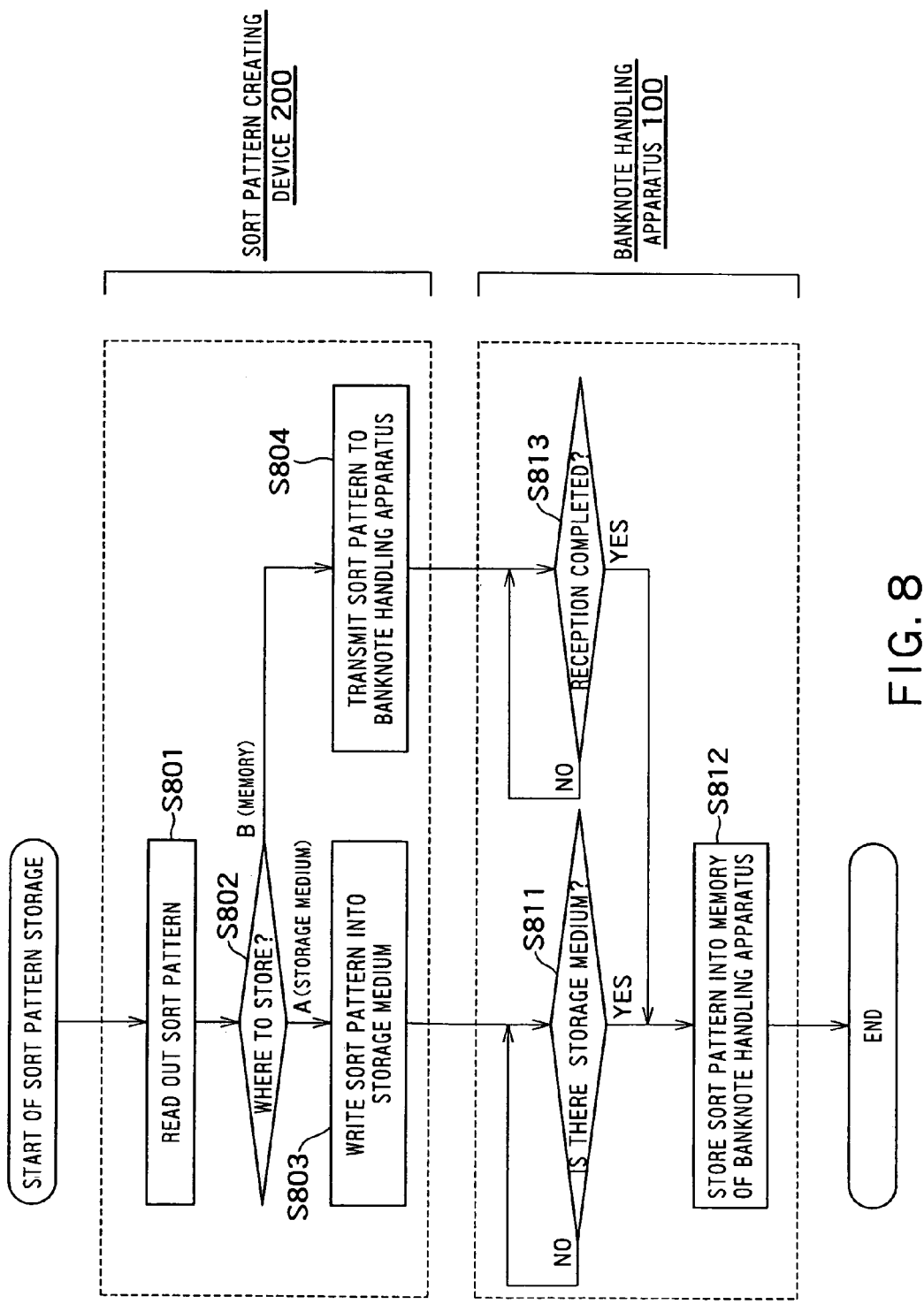
FIG. 8 is a flowchart showing operation procedures to be carried out by a sort pattern creating system in a sort pattern storing operation in accordance with the second embodiment.

FIG. 8 is a flowchart showing operation procedures to be carried out by the sort pattern creating system in a sort pattern storing operation in accordance with the second embodiment. First, the sort pattern creating device 200 reads out the sort pattern stored in the storage unit 202 (S801). In a case where the sort pattern is to be stored into a storage medium (S802-A), the storage medium access unit 212 is controlled to write the sort pattern (S803). In a case where the sort pattern is to be stored directly into the memory 112 of the banknote handling apparatus 100 (S802-B), the communication control unit 211 is controlled to transmit the sort pattern (S804).

On the other hand, in the banknote handling apparatus 100, in a case where a storage medium is inserted to the storage medium access unit 108 (S811-Yes), the sort pattern stored in the storage medium is stored into the memory 112 (S812). In a case where reception of the sort pattern transmitted from the sort pattern creating device 200 by the communication control unit 115 is completed (S813-Yes), the received sort pattern is stored into the memory 112 (S812). After the procedure of S812 is completed, the sort pattern storing operation is ended.

In the second embodiment, sort patterns are stored into the memory 112 of the banknote handling apparatus 100 via a storage medium or a network. Accordingly, the work load of the small-sized operation unit 103 of the banknote handling apparatus 100 can be reduced.

Third Embodiment

Next, a third embodiment of the present invention is described. In the first and second embodiments, example cases where sort pattern is created by the sort pattern creating devices 200 are described. In the third embodiment, an example case where sort pattern is created by the host device 300 is described. It should be noted that explanation of the same aspects as those of the first and second embodiments is not described herein.

Figure 9:
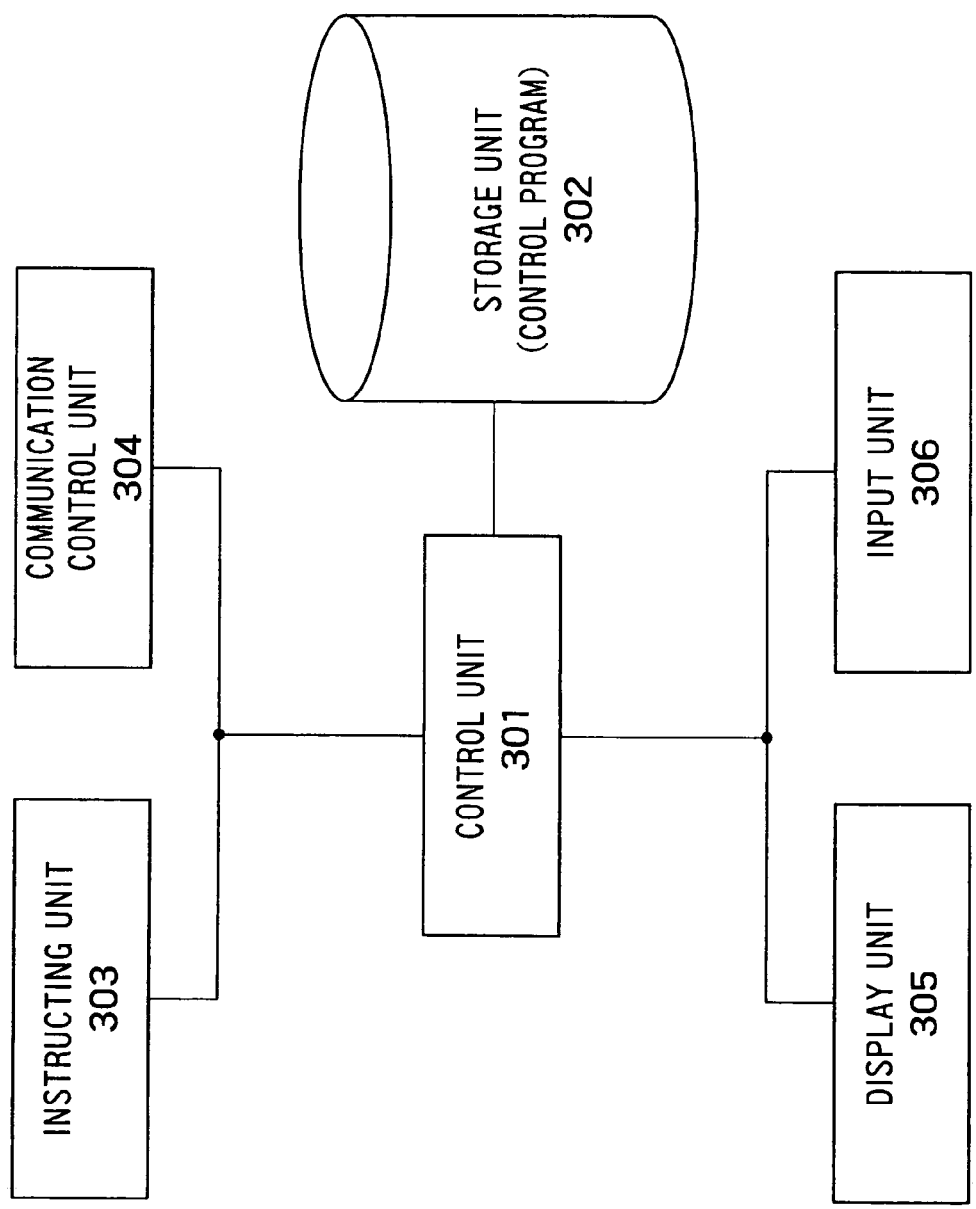
FIG. 9 is a block diagram showing a structure of a host device 300 in accordance with the third embodiment of the present invention.

FIG. 9 is a block diagram showing the structure of the host device 300 in accordance with the third embodiment of the present invention. The host device 300 comprises a control unit 301 and a storage unit 302. The control unit 301 controls an instructing unit 303 that is the same as the selecting unit 203 of FIG. 4, a communication control unit 304, a display unit 305, and an input unit 306.

The control unit 301 controls the instructing unit 303, the communication control unit 304, the display unit 305, and the input unit 306. A control program designed for the control unit 301 to control the respective units is stored in the storage unit 302. The instructing unit 303 issues instructions to one or more sort pattern creating devices 200. The communication control unit 304 exchanges data with the sort pattern creating device 200. The display unit 305 displays the figure serving as the instructing unit 303. The input unit 306 is designed for an operator to input instructions. For example, the communication control unit 304 may be a network interface, the display unit 305 may be a liquid crystal display, and the input unit 306 may be a keyboard or a mouse.

In the third embodiment, even in a case where the same pattern is created in the plurality of sort pattern creating devices 200 located at remote places, instructions can be simultaneously issued with the use of the host device 300. Accordingly, the task required for setting the sort pattern can be simplified, and a wrong operation by an operator can be prevented.

Fourth Embodiment

Next, a fourth embodiment of the present invention is described. In the first through third embodiments, example cases where sort pattern is created are described. In the fourth embodiment, an example case where the banknote handling apparatus 100 is controlled according to the created sort pattern is described.

Figure 12:
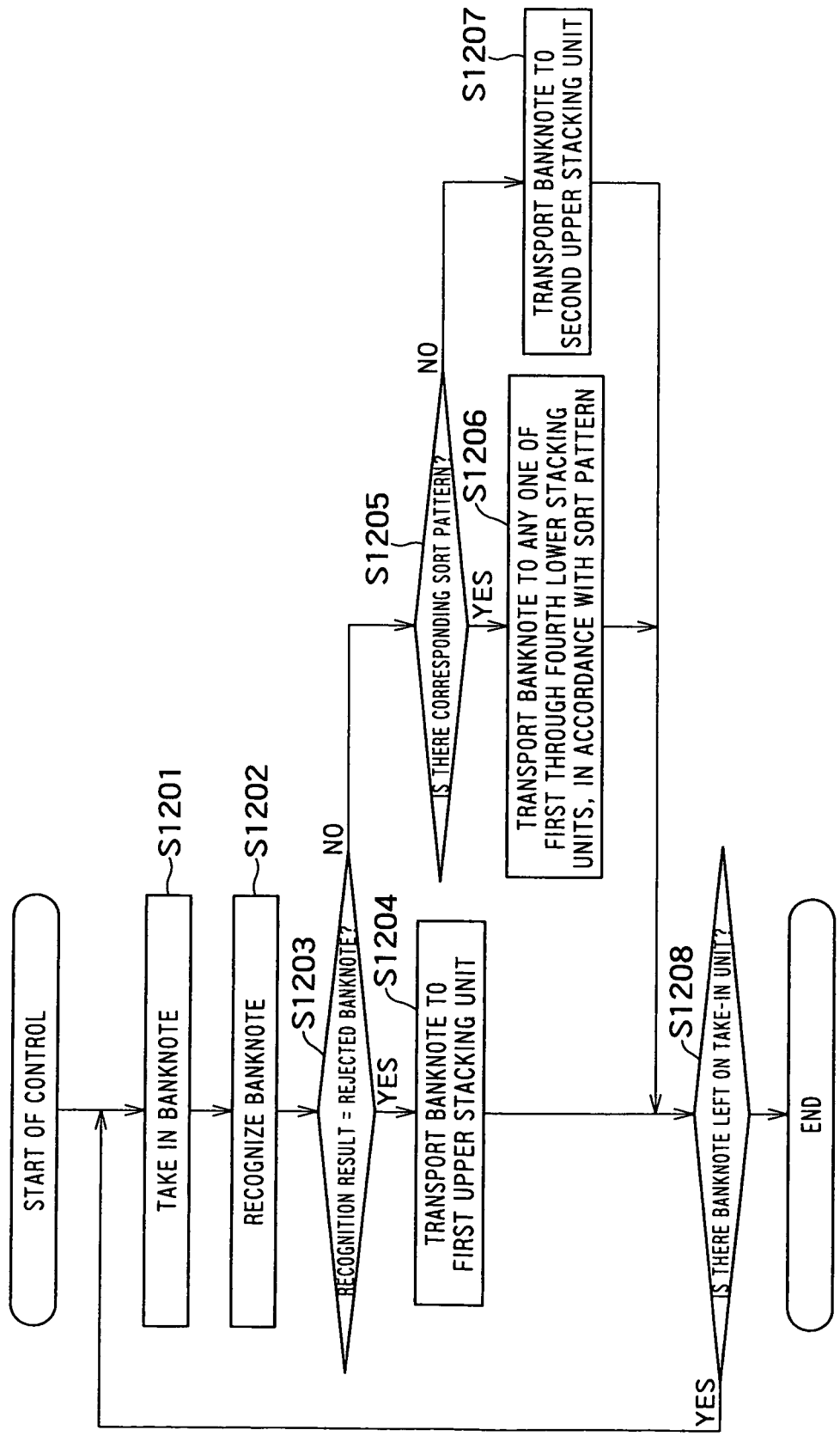
FIG. 12 is a flowchart showing the operation procedures to be carried out by a control unit 111 to control the banknote handling apparatus 100 in accordance with the fourth embodiment of the present invention.

FIG. 12 is a flowchart showing the operation procedures to be carried out by the control unit 111 to control the banknote handling apparatus 100 in accordance with the fourth embodiment of the present invention. First, the control unit 111 controls the take-in unit 101 to take in the stacked banknotes thereon one by one (S1201). The recognition unit 113 is then controlled to recognize the attribute of each of the banknotes taken in by the take-in unit 101 (S1202). If the recognition result of S1202 indicates a rejected banknote (S1203-Yes), the transport unit 114 is controlled to transport the rejected banknote to the first upper stacking unit 102a (S1204).

On the other hand, if the recognition result of S1202 does not indicate a rejected banknote (S1203-No) and corresponds to the sort pattern stored in the memory 112 (S1205-Yes), the transport unit 114 is controlled to transport the banknote to one of the first through fourth lower stacking units 106a through 106d, according to the sort pattern (S1206). If the recognition result of S1202 does not correspond to the sort pattern (S1205-No), the transport unit 114 is controlled to transport the banknote to the second upper stacking unit 102b (S1207).

If there is one or more banknotes left on the take-in unit 101 after the procedure of S1204, S1206, or S1207 is completed (S1208-Yes), the operation returns to S1201. If no banknotes are left on the take-in unit 101 after the procedure of S1204, S1206, or S1207 is completed (S1208-No), the control operation is ended.

In the fourth embodiment, banknotes placed on the take-in unit 101 are stacked onto the first through fourth lower stacking units 106a through 106d, according to the created sort pattern. Accordingly, the work load of the operator in the banknote sorting operation can be lightened.

The invention claimed is:

1. A sort pattern creating method for creating a sort pattern, for a banknote handling apparatus in which a banknote is stacked in any one of a plurality of stacking units in accordance with the sort pattern, the sort pattern creating method comprising:
    a step of selecting a denomination of banknote to be stacked from among a plurality of options for the denomination;
    a step of selecting a print version of banknote to be stacked from among a plurality of options for the print version, independently of the content selected in the step of selecting a denomination of banknote;
    a step of selecting a direction of banknote to be stacked from among a plurality of options for the direction, independently of the contents selected in the step of selecting a denomination of banknote and the step of selecting a print version of banknote;
    a step of selecting a fitness of banknote to be stacked from among a plurality of options for the fitness, independently of the contents selected in the step of selecting a denomination of banknote, the step of selecting a print version of banknote and the step of selecting a direction of banknote;
    a step of creating the sort pattern by combining the contents selected in the step of selecting a denomination of banknote, the step of selecting a print version of banknote, the step of selecting a direction of banknote and the step of selecting a fitness of banknote; and
    a step of checking a validity of the combination of the contents selected in the step of selecting a denomination of banknote, the step of selecting a print version of banknote, the step of selecting a direction of banknote and the step of selecting a fitness of banknote, wherein the combination is valid when one stacking unit where a type of banknote is to be stacked is defined, and the combination is not valid when one stacking unit where a type of banknote is to be stacked is not defined.

2. The sort pattern creating method according to claim 1, wherein if the combination of the selected contents is determined to be valid in the step of checking a validity of the combination of the selected contents, the sort pattern is created by combining the selected contents, wherein the sort pattern creating method further comprising a step of notifying an invalid item, if the combination of the selected contents is determined to be invalid in the step of checking a validity of the combination of the selected contents.

3. The sort pattern creating method according to claim 1, further comprising a step of notifying an invalid item, if the combination of the selected contents is determined to be invalid in the step of checking a validity of the combination of the selected contents.

4. The sort pattern creating method of claim 1, further comprising a step of displaying graphics of the contents selected in the step of selecting a denomination of banknote, the step of selecting a print version of banknote, the step of selecting a direction of banknote and the step of selecting a fitness of banknote.

5. The sort pattern creating method according to claim 1, further comprising a step of storing the sort pattern created in the step of creating the sort pattern; and a step of editing the sort pattern by first reading out the sort pattern stored in the step of storing the sort pattern, and then editing the sort pattern read out by combining contents selected in the step of selecting a denomination of banknote, the step of selecting a print version of banknote, the step of selecting a direction of banknote and the step of selecting a fitness of banknote,
wherein the sort pattern edited in the step of editing the sort pattern is stored in the step of storing the sort pattern.

6. The sort pattern creating method according to claim 5, further comprising a step of editing the sort pattern by first reading out the sort pattern stored in the step of storing the sort pattern, and then editing the sort pattern read out by combining contents selected in the step of selecting a denomination of banknote, the step of selecting a print version of banknote, the step of selecting a direction of banknote and the step of selecting a fitness of banknote,
wherein the sort pattern edited in the step of editing the sort pattern is stored in the step of storing the sort pattern.

7. The sort pattern creating method according to claim 1, further comprising a step of performing an input support so as to input a valid item instead of an invalid item, if the combination of the selected contents is determined to be invalid in the step of checking a validity of the combination of the selected contents.

8. The sort pattern creating method according to claim 7, wherein the valid item is displayed instead of the invalid item in the step of performing an input support.

9. A sort pattern creating device for creating a sort pattern, for a banknote handling apparatus in which a banknote is stacked in any one of a plurality of stacking units in accordance with the sort pattern, the sort pattern creating device comprising:
a denomination selecting unit for selecting a denomination of banknote to be stacked from among a plurality of options for the denomination;
a print version selecting unit for selecting a print version of banknote to be stacked from among a plurality of options for the print version, independently of the content selected by the denomination selecting unit;
a direction selecting unit for selecting a direction of banknote to be stacked from among a plurality of options for the direction, independently of the contents selected by the denomination selecting unit and the print version selecting unit;
a fitness selecting unit for selecting a fitness of banknote to be stacked from among a plurality of options for the fitness, independently of the contents selected by the denomination selecting unit, the print version selecting unit and the direction selecting unit;
a creating unit for creating the sort pattern by combining the contents selected by the denomination selecting unit, the print version selecting unit, the direction selecting unit and the fitness selecting unit; and
a checking unit for checking a validity of the combination of the contents selected by the denomination selecting unit, the print version selecting unit, the direction selecting unit and the fitness selecting unit, the checking unit judging that the combination is valid when one stacking unit where a type of banknote is to be stacked is defined, and that the combination is not valid when one stacking unit where a type of banknote is to be stacked is not defined.

10. The sort pattern creating device according to claim 9, wherein if the combination of the selected contents is determined to be valid by the checking unit, the creating unit creates the sort pattern by combining the selected contents, and wherein the sort pattern creating device further comprising a notifying unit for notifying an invalid item, if the combination of the selected contents is determined to be invalid by the checking unit.

11. The sort pattern creating device according to claim 9, further comprising a transmitting unit for transmitting the sort pattern created by the creating unit to the banknote handling apparatus via a network which communicably connects the sort pattern creating device and the banknote handling machine.

12. The sort pattern creating device according to claim 9, further comprising a notifying unit for notifying an invalid item, if the combination of the selected contents is determined to be invalid by the checking unit.

13. The sort pattern creating device according to claim 9, further comprising a display unit for displaying graphics of the contents selected by the denomination selecting unit, the print version selecting unit, the direction selecting unit and the fitness selecting unit.

14. The sort pattern creating device according to claim 9, further comprising a storage unit for storing the sort pattern created by the creating unit; and
an edit unit for editing the sort pattern by first reading out the sort pattern stored in the storage unit, and then editing the sort pattern read out by combining contents selected by the denomination selecting unit, the print version selecting unit, the direction selecting unit and the fitness selecting unit,
wherein the storage unit stores the sort pattern edited by the edit unit.

15. The sort pattern creating device according to claim 14, the storage unit is a storage medium which is detachable and is capable of being read out in the banknote handling apparatus.

16. The sort pattern creating device according to claim 14, further comprising an edit unit for editing the sort pattern by first reading out the sort pattern stored in the storage unit, and then editing the sort pattern read out by combining contents selected by the denomination selecting unit, the print version selecting unit, the direction selecting unit and the fitness selecting unit,
wherein the storage unit stores the sort pattern edited by the edit unit.

17. The sort pattern creating device according to claim 9, further comprising an input supporting unit for performing an input support so as to input a valid item instead of an invalid item, if the combination of the selected contents is determined to be invalid by the checking unit.

18. The sort pattern creating device according to claim 17, wherein the input supporting unit displays the valid item instead of the invalid item.

19. A sort pattern creating system comprising a banknote handling apparatus in which are a banknote is stacked in any one of a plurality of stacking units in accordance with a sort pattern, a sort pattern creating device for creating the sort pattern, for the banknote handling apparatus, and a first network which communicably connects the banknote handling apparatus and the sort pattern creating device;

wherein the sort pattern creating device comprising;

a denomination selecting unit for selecting a denomination of banknote to be stacked from among a plurality of options for the denomination;

a print version selecting unit for selecting a print version of banknote to be stacked from among a plurality of options for the print version, independently of the content selected by the denomination selecting unit;

a direction selecting unit for selecting a direction of banknote to be stacked from among a plurality of options for the direction, independently of the contents selected by the denomination selecting unit and the print version selecting unit;

a fitness selecting unit for selecting a fitness of banknote to be stacked from among a plurality of options for the fitness, independently of the contents selected by the denomination selecting unit, the print version selecting unit and the direction selecting unit;

a creating unit for creating the sort pattern by combining the contents selected by the denomination selecting unit, the print version selecting unit, the direction selecting unit and the fitness selecting unit;

a first transmitting unit for transmitting the sort pattern created by the creating unit to the banknote handling apparatus; and a checking unit for checking a validity of the combination of the contents selected by the denomination selecting unit, the print version selecting unit, the direction selecting unit and the fitness selecting unit, the checking unit judging that the combination is valid when one stacking unit where a type of banknote is to be stacked is defined, and that the combination is not valid when one stacking unit where a type of banknote is to be stacked is not defined, wherein the banknote handling apparatus comprising a memory which stores the sort pattern transmitted by the first transmitting unit.

20. The sort pattern creating system according to claim 19, wherein the sort pattern creating device further comprises a storage unit for storing the sort pattern created by the creating unit.

21. The sort pattern creating system according to claim 19, wherein the creating unit creates the sort pattern by combining the selected contents, if the combination of the selected contents is determined to be valid by the checking unit.

22. The sort pattern creating system according to claim 19, wherein the sort pattern creating device further comprises a notifying unit for notifying an invalid item, if the combination of the selected contents is determined to be invalid by the checking unit.

23. The sort pattern creating system according to claim 19, wherein the sort pattern creating device further comprises a display unit for displaying graphics of the contents selected by the denomination selecting unit, the print version selecting unit, the direction selecting unit and the fitness selecting unit.

24. The sort pattern creating system according to claim 19, wherein the banknote handling apparatus comprises;

a take-in unit for taking in the banknotes thereon one by one, the take-in unit being provided in the upper part of the banknote handling apparatus;

a recognition unit for recognizing the banknote taken in by the take-in unit;

a first upper stacking unit for stacking the rejected banknote, the first upper stacking unit being provided in the upper part of the banknote handling apparatus;

a second upper stacking unit for stacking the banknote other than the rejected banknote, the second upper stacking unit being provided adjacent to the first upper stacking unit;

first through fourth lower stacking units for stacking the banknote of at least one specified denomination respectively, the first through fourth lower stacking units being provided in parallel in the lower part of the banknote handling apparatus;

a transport unit for transporting the banknote taken in by the take-in unit to any one of the first upper stacking unit, the second upper stacking unit and the first through fourth lower stacking unit; and a control unit for controlling the transport unit in accordance with the sort pattern stored in the memory.

25. The sort pattern creating system according to claim 24, wherein the sort pattern creating device further comprises a first instructing unit for issuing an instruction to the control unit, wherein the first transmitting unit transmits the instruction issued by the first instructing unit to the banknote handling apparatus via the first network, wherein the control unit controls the transport unit in accordance with the instruction transmitted by the first transmitting unit and the sort pattern stored in the memory.

26. The sort pattern creating system according to claim 24, wherein the sort pattern creating device is connected to the plurality of banknote handling apparatuses via the first network, wherein the first transmitting unit transmits the sort pattern created by the creating unit to the plurality of banknote handling apparatuses simultaneously via the first network, wherein each control unit of the plurality of banknote handling apparatuses controls the transport unit in accordance with the instruction transmitted by the first transmitting unit and the sort pattern stored in the memory.

27. The sort pattern creating system according to claim 24, wherein the sort pattern creating device further comprises a first storage medium access unit for reading out and storing the sort pattern with respect to the storage medium, wherein the banknote handling apparatus further comprises a second storage medium access unit for reading out and storing the sort pattern with respect to the storage medium, wherein the memory stores the sort pattern read out by the second storage medium access unit.

28. The sort pattern creating system according to claim 27, wherein the banknote handling apparatus further comprises a setting unit for setting the sort pattern to be used from among a plurality of sort patterns stored in the memory, wherein the control unit controls the transport unit in accordance with the sort pattern set by the setting unit.

29. The sort pattern creating system according to claim 19, further comprising a host device connected to the sort pattern creating device via a second network, wherein the host device comprises;

a second instructing unit for instructing the contents to be selected by the denomination selecting unit, the print version selecting unit, the direction selecting unit and the fitness selecting unit; and a second transmitting unit for transmitting the instructions issued by the second instructing unit to the sort pattern creating device via the second network, wherein the creating unit creates the sort pattern by combining the instructions transmitted by the second transmitting unit.

30. The sort pattern creating system according to claim 29, wherein the host device is connected to the plurality of sort pattern creating devices via the second network, wherein the second transmitting unit transmits the instructions issued by the second instructing unit to the plurality of sort pattern creating devices simultaneously via the second network.

31. The sort pattern creating system according to claim 19, wherein the sort pattern creating device further comprises an input supporting unit for performing an input support so as to input a valid item instead of an invalid item, if the combination of the selected contents is determined to be invalid by the checking unit.

32. The sort pattern creating system according to claim 31, wherein the input supporting unit displays the valid item instead of the invalid item.

33. The sort pattern creating system according to claim 20, wherein the sort pattern creating device further comprises an edit unit for editing the sort pattern by first reading out the sort pattern in the storage unit, and then editing the sort pattern read out by combining contents selected by the denomination selecting unit, the print version selecting unit, the direction selecting unit and the fitness selecting unit, wherein the storage unit stores the sort pattern edited by the edit unit.

* * * * *